US012631438B2

(12) United States Patent
Milani

(10) Patent No.: US 12,631,438 B2
(45) Date of Patent: May 19, 2026

(54) STACKABLE AND/OR NESTABLE BOX

(71) Applicant: FAMI S.R.L., Rosa' (IT)

(72) Inventor: Luca Milani, Rossano Veneto (IT)

(73) Assignee: FAMI S.R.L., Rosa' (IT)

( * ) Notice: Subject to any disclaimer, the term of this patent is extended or adjusted under 35 U.S.C. 154(b) by 60 days.

(21) Appl. No.: 18/599,672

(22) Filed: Mar. 8, 2024

(65) Prior Publication Data

US 2024/0317458 A1     Sep. 26, 2024

(30) Foreign Application Priority Data

Mar. 21, 2023     (IT) ........................ 102023000005343

(51) Int. Cl.
B65D 21/04          (2006.01)
B65D 21/02          (2006.01)
G01B 9/02          (2022.01)
G01B 9/02001          (2022.01)

(52) U.S. Cl.
CPC ............ G01B 9/02011 (2013.01); G01B 9/02 (2013.01)

(58) Field of Classification Search
CPC .............. B65D 21/048; B65D 21/0213; B65D 21/0233; G01B 9/02011; G01B 9/02061; G01B 9/02058; G01B 9/02097; G01N 21/6445; G01N 21/6456; G01N 2021/6421; G01J 3/45
See application file for complete search history.

(56) References Cited

U.S. PATENT DOCUMENTS 5,071,008 A * 12/1991 Hradisky ............. B65D 21/048
206/507

FOREIGN PATENT DOCUMENTS

| CH | 379386 | 6/1964 |
| GB | 2227232 | 7/1990 |
| NL | 9200851 | 12/1993 |

OTHER PUBLICATIONS

Italian Search Report and Written Opinion, issued on Oct. 12, 2023 in IT 202300005343, 6 pages.

* cited by examiner

*Primary Examiner* — Andrew D Perreault
(74) *Attorney, Agent, or Firm* — Chrisman Gallo Tochtrop LLC

(57) ABSTRACT

Stackable and/or nestable box having a bottom wall and a side wall which rises from the bottom wall and which is defined by side panels, a front panel and a rear panel. The side panels include at least one recessed portion which is recessing from the containment volume and at least one portion protruding towards the containment volume. The box is configured to be nested within another box and to be stacked with other boxes or other containers with dimensions compatible with, or close to, the dimensions of box.

9 Claims, 4 Drawing Sheets

STACKABLE AND/OR NESTABLE BOX

The present invention relates to a stackable and/or nestable box, depending on the needs, for the temporary storage of objects of various kinds such as, for example, screws, bolts, work tools, garments or stationery.

The invention is therefore part of the sector of space-saving containers capable of being both stacked (when filled) and nested (when empty).

Generally, a stackable box comprises a bottom wall and a side wall, the side wall comprises side panels, a front panel and a rear panel, substantially defining a side wall raised from the bottom wall.

That is, a stackable box has a box-like configuration open above comprising an upper portion and a lower portion.

In detail, the upper portion is adapted to restingly receive a lower portion of another identical upper box, while the lower portion is adapted to rest on the upper portion of another identical lower box.

In some embodiments, a known box comprises teeth and housings capable of corresponding to respective housings and teeth of other identical boxes, thus realising a stack of boxes.

Such known boxes are stackable or nestable by selecting the reciprocal position between two adjacent boxes, in particular starting from two different positions differently staggered from each other.

Disadvantageously, the known boxes are adapted to be stacked with identical boxes. That is, the known boxes do not allow the possibility of stacking two boxes with similar dimensions but with different structures (for example because of different product lines) in a stable manner. In this context, the technical task underlying the present invention is to provide a space-saving container which obviates the drawbacks in the prior art as described above.

In particular, an object of the present invention is to propose a stackable and/or nestable box which allows a stacking thereof with other space-saving containers with the same dimensions, or with compatible dimensions.

A further object of the present invention is to propose a stackable and/or nestable box which promotes or facilitates a stacking with other space-saving containers with the same dimensions, or with compatible dimensions.

That is, an object of the present invention is to provide a stackable and/or nestable box capable of being stacked even with boxes which are normally not stackable with each other due to different design criteria chosen for performing the stacking.

The technical task set and the object specified are substantially attained by a stackable and/or nestable box comprising the technical features as set out in one or more of the appended claims.

In particular, the present invention relates to a box intended to contain objects of various kinds therein.

The box comprises a bottom wall and a side wall which rises from the bottom wall to define a containment volume open above.

The side wall comprises at least one pair of recessed portions which are recessing from the containment volume and facing each other and at least one pair of portions protruding towards the containment volume facing each other.

Preferably, each recessed portion is configured to fit inside a corresponding recessed portion of a lower identical box that is stackable and/or nestable in a nesting configuration.

Preferably, each protruding portion comprises at least one side rest surface above, configured to restingly receive a base portion of a container in a stacking configuration.

The container has dimensions compatible with, or close to, the dimensions of the stackable and/or nestable box.

Preferably, the side wall is adapted to rest on an upper portion of the container in a stacking configuration.

Preferably, the side rest surface comprises at least a first base surface and at least one guide tooth.

The guide tooth defines a guide surface inclined towards the first base surface and facing the containment volume.

The guide tooth further defines a second base surface, consecutive with respect to the guide surface.

The first and/or the second base surface are intended to restingly receive a base portion of the container in a stacking configuration.

Advantageously, the first and/or the second base surface allows to make the box compatible for stacking with containers having different structural and/or dimensional features.

Further features and advantages of the present invention will become more apparent from the indicative, and therefore non-limiting, description of preferred but non-exclusive embodiments of a stackable and/or nestable box.

Such a description will be set out below with reference to the accompanying drawings, which are provided solely for illustrative and therefore non-limiting purposes, in which.

With reference to the accompanying drawings, the numerical reference 100 indicates a stackable and/or nestable box which is the subject-matter of the present invention, while the numerical reference 200 indicates a container of dimensions similar to the dimensions of the box 100, but of a different structure.

Figures 1, 2:
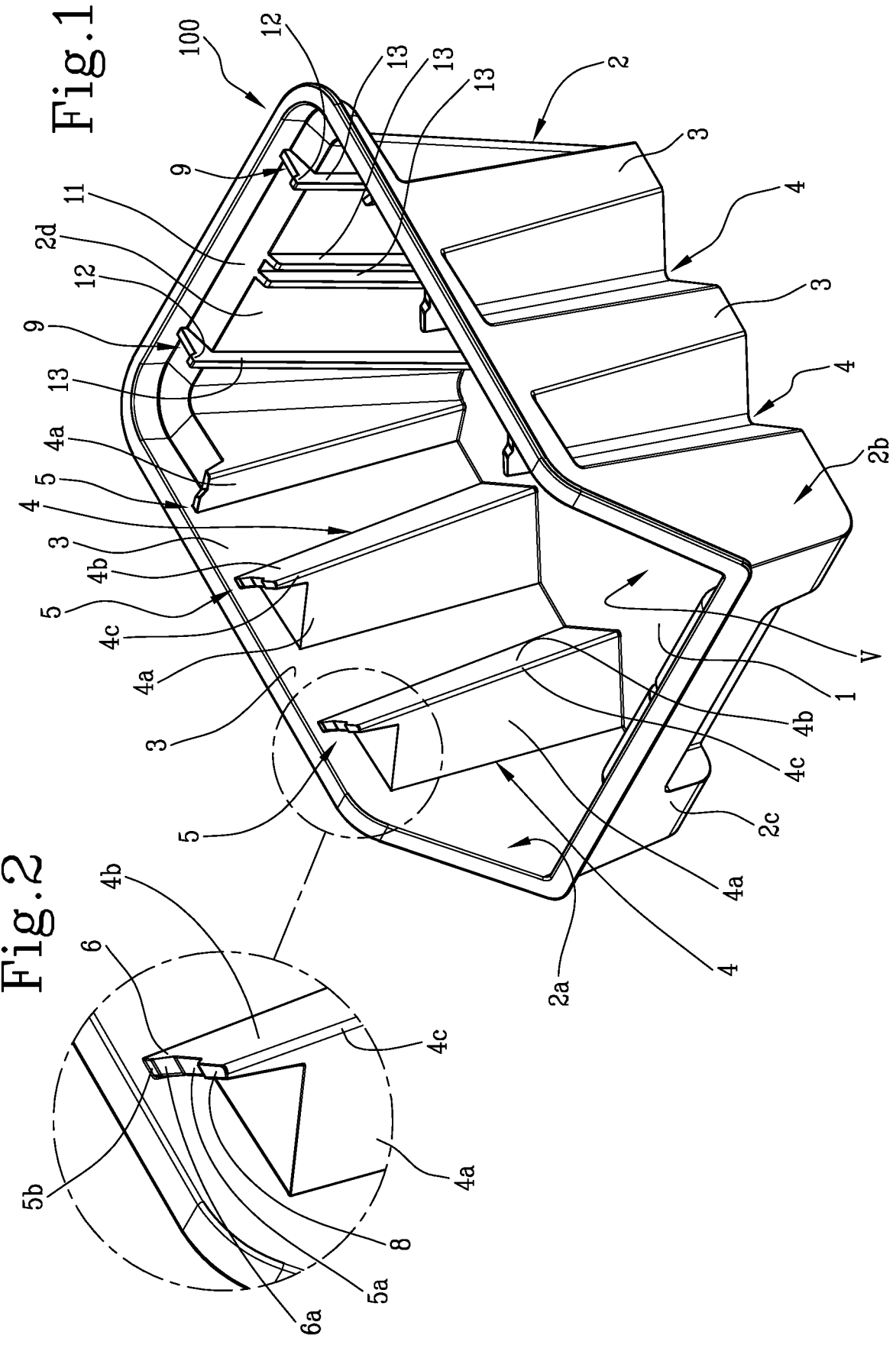
FIG. 1 is a perspective and schematic view of a box which is the subject-matter of the present invention in a first embodiment thereof.
FIG. 2 is a view of a detail of FIG. 1.
Figures 3, 4:
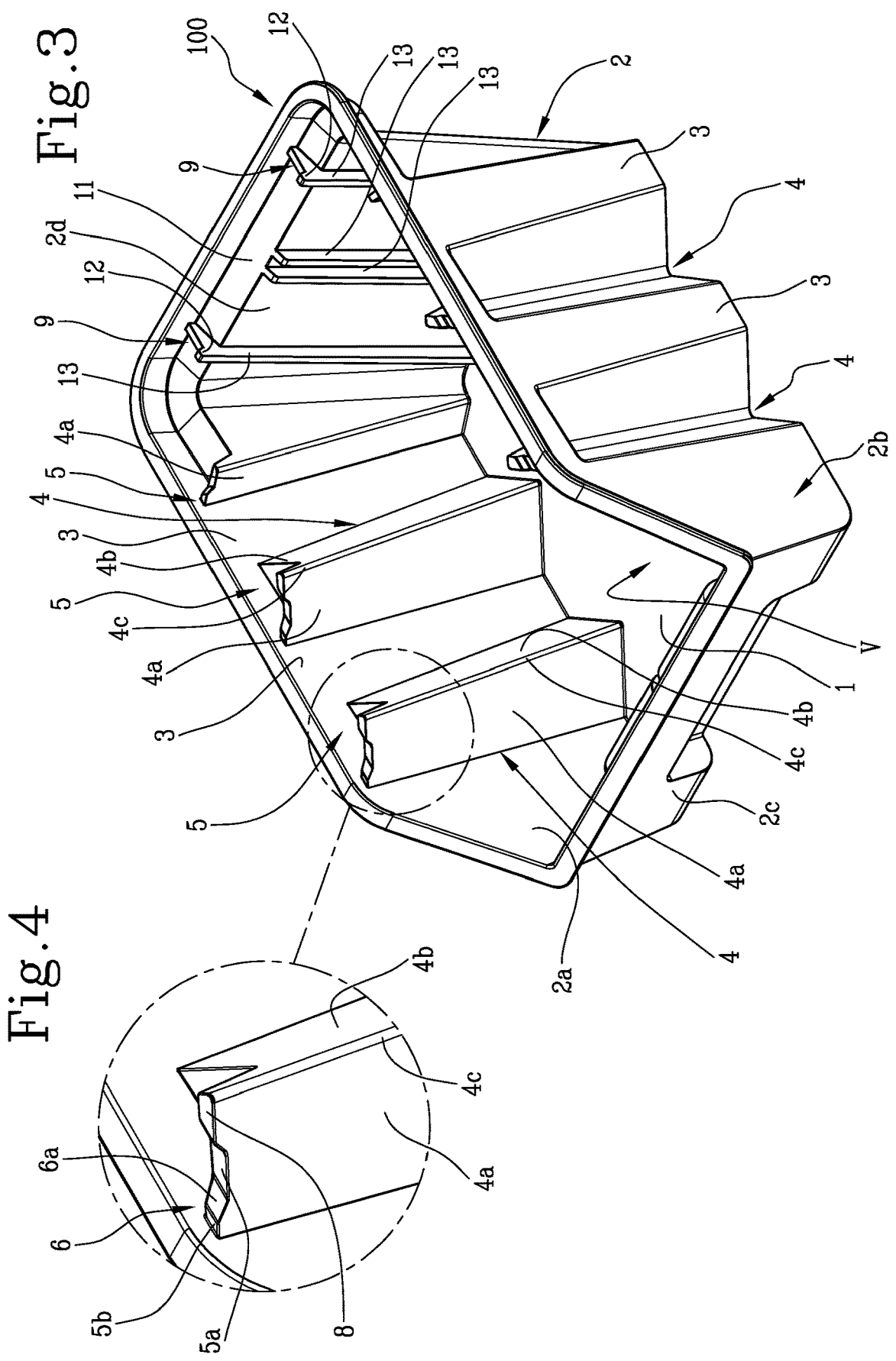
FIG. 3 is a perspective and schematic view of a box which is the subject-matter of the present invention in a second embodiment thereof.
FIG. 4 is a view of a detail of FIG. 3.

In detail, the stackable and/or nestable box 100 which is the subject-matter of the present invention comprises a bottom wall 1 and a side wall 2 which rises from the bottom wall 1 to define a containment volume "V" open above, as illustrated in FIGS. 1 and 3.

With reference to the containment volume "V", any spatial portion comprised in said volume "V" is defined as the inside of the box 100 while any other spatial portion is defined as the outside.

Preferably, the box 100 is defined by a single monolithic body, for example made of plastic material, in particular the box 100 is obtained by a moulding process.

Figures 5, 6:
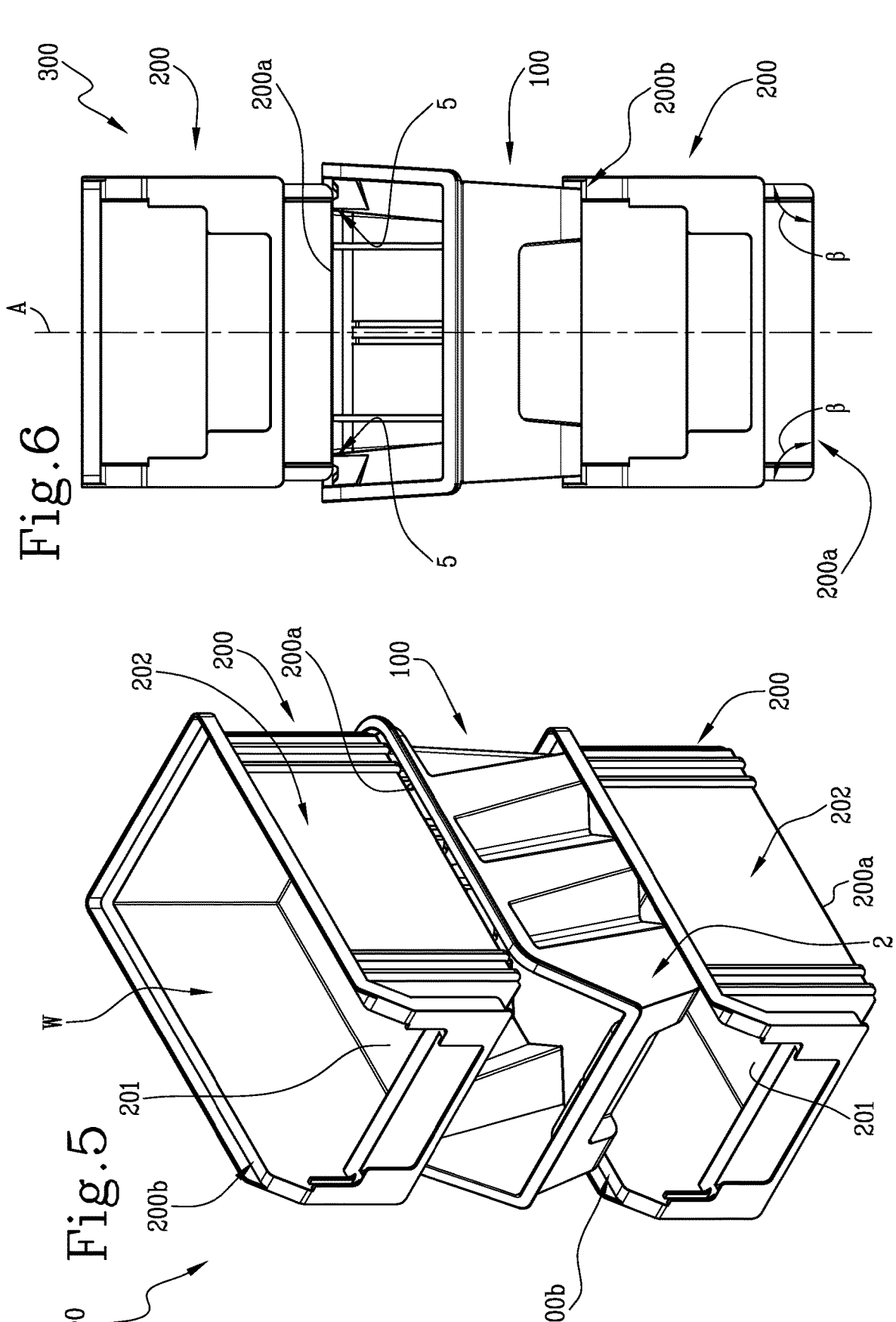
FIG. 5 is a schematic and perspective view of a stack comprising at least one box stacked with other containers.
FIG. 6 is a schematic and front view of the stack of FIG. 5.

Similarly, as illustrated in FIG. 5, the container 200 comprises a respective bottom wall 201 and a respective side wall 202 which rises from the bottom wall 201 to define a corresponding containment volume 'W'.

The box 100 preferably has a different containment volume 'V', i.e., greater or less than the containment volume 'W' of the container 200.

Preferably, a conformation, or a dimension, of the bottom wall 201 of the container 200 and of the bottom wall 1 of the box 100 are similar to each other. That is, at least one dimension between the width and length of the container 200 is similar, or close, to a respective dimension of the box 100.

With reference to FIGS. 5 and 6, the box 100 is configured to be stackable with a container 200 in a stacking configuration, for example when the box 100 and/or the container 200 contain objects therein.

That is, the box 100 is stackable with a container 200 having dimensions substantially similar to the dimensions of the box 100 which is the subject-matter of the present invention.

The box 100 is thus configured such that it can be superimposed on a container 200 forming a stack 300 along a vertical axis "A", transverse to the bottom wall 1.

Figure 8:
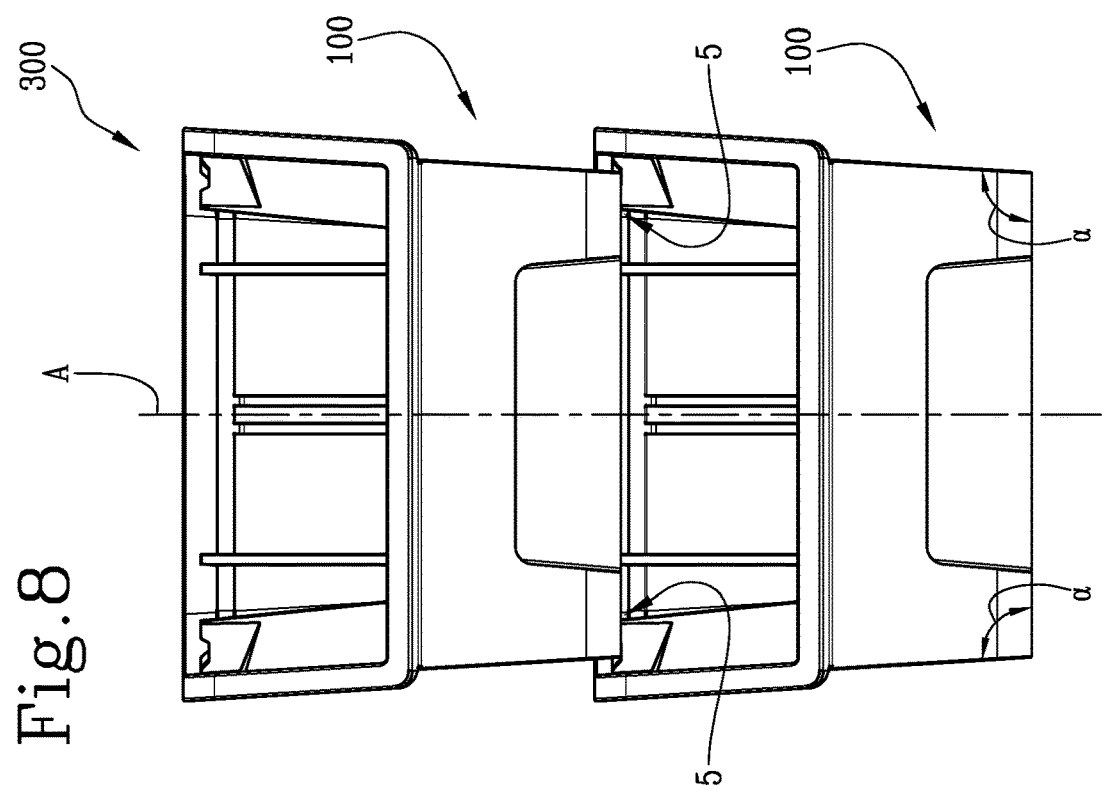
FIG. 8 is a schematic and front view of the stack of FIG. 7.
Figure 7:
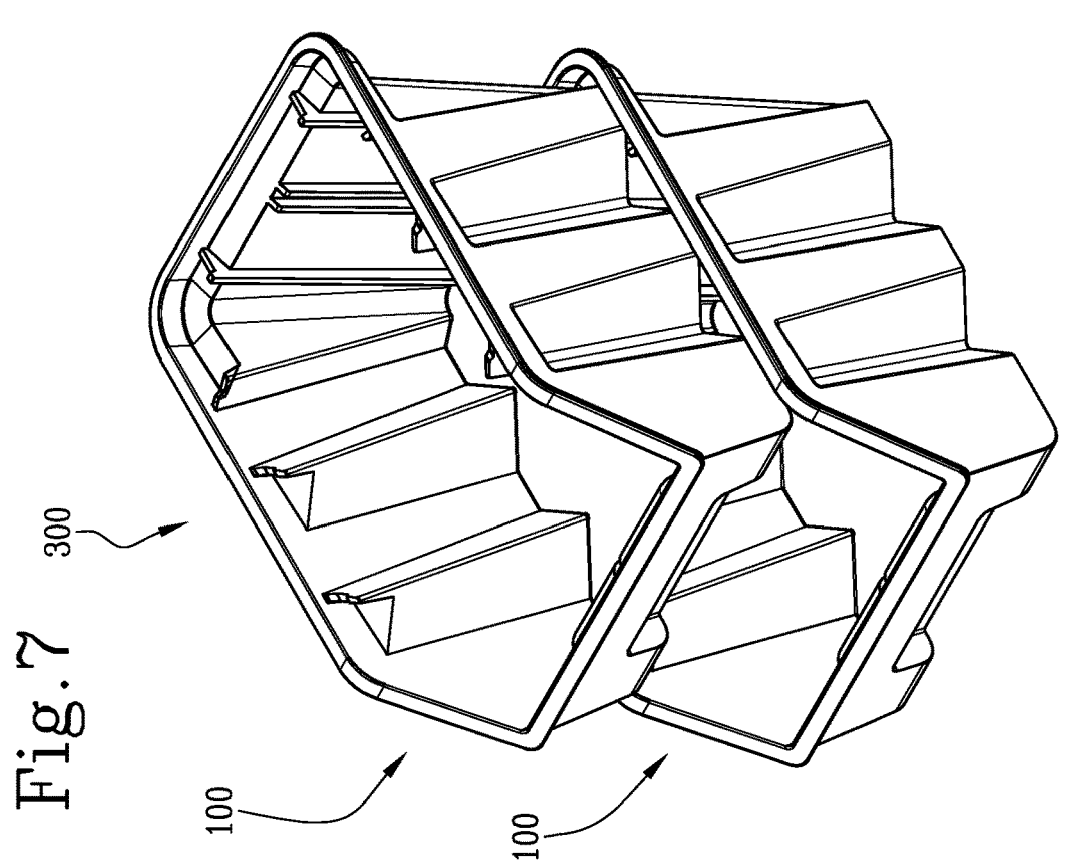
FIG. 7 is a schematic and perspective view of a further stack of stacked boxes.

With reference to FIGS. 7 and 8, the box 100 is further configured to be stacked (in a stacking configuration) with a box 100 identical thereto and with the same dimensions, for example when containing objects therein.

That is, the box 100 is configured such that it can be superimposed on another box 100 forming a stack 300 along a vertical axis "A", transverse to the bottom wall 1.

The box 100 is also configured to be nestable within other boxes 100 in a nesting configuration (not illustrated in the accompanying drawings), for example when empty. That is, the box 100 is configured such that it can be fitted in another lower box 100 identical thereto, forming a stack 300 along the axis "A", for example saving space when the box 100 is transported or stored.

Considering a plurality of boxes 100 and containers 200, it is therefore possible to realise a stack 300:
- by arranging the boxes 100 and/or the containers 200 in a stacking configuration, in which the boxes 100 and/or the containers 200 are superimposed, as illustrated in FIGS. 5-8,
- by arranging the boxes 100 in a nesting configuration (not illustrated in the accompanying drawings), in which the boxes 100 are fitted (or nested) within each other, or
- by implementing both of the above configurations in a single stack (not illustrated in the accompanying drawings).

With reference to FIGS. 1 and 3, the side wall 2 of the box 100 consists of side panels 2a and 2b, a front panel 2c and a rear panel 2d.

More in detail, the side panels 2a and 2b each have at least one portion that is recessing 3 from the containment volume "V" and at least one portion protruding 4 towards the containment volume "V". That is, both the panel 2a and the panel 2b have at least one recessing portion 3 and at least one protruding portion 4.

Preferably, both the panel 2a and the panel 2b have a plurality of recessed portions 3 and a plurality of protruding portions 4.

The recessed portion 3 is configured to easily fit within a corresponding recessed portion 3 of a lower box 100, when in a nesting configuration.

As regards the stacking configuration, the protruding portion 4 comprises at least one side rest surface 5 above, useful for defining a vertical support of an upper box 100 or an upper container 200. That is, both the side panel 2a and the side panel 2b comprise at least one protruding portion 4, in turn comprising at least one side rest surface 5.

With reference to a stack 300 such as that illustrated in FIGS. 5 and 6, i.e., a stack 300 comprising at least one box 100 and at least one container 200, the side support surface 5 is configured to restingly receive a base portion 200a of the container 200 and the side wall 2 is adapted to rest on an upper portion 200b of the container 200.

In detail, the base portion 200a is a portion of the container 200 intended to be rested on a surface, such as on a floor, ground or desk, while the upper portion 200b is a portion of the container 200 which is peripheral and opposite the base portion 200a. That is, the upper portion 200b is a peripheral portion adapted to define an upper opening of the container 200 useful to allow an insertion of objects of various types within the container 200 itself.

With reference to a stack 300 such as that illustrated in FIGS. 7 and 8, i.e., a stack 300 comprising boxes 100, each recessed portion 3 of the box 100 is configured to rest on a corresponding side rest surface 5 of a lower box 100, when in a stacking configuration.

As illustrated in FIGS. 2 and 4, the side rest surface 5 comprises at least a first base surface 5a and at least one guide tooth 6.

With reference to a stack 300 such as that illustrated in FIGS. 7 and 8, i.e., a stack 300 comprising boxes 100, the first base surface 5a is destined to restingly receive a recessed portion 3 of an upper box 100, when in a stacking configuration.

The guide tooth 6 defines a guide surface 6a inclined towards the first base surface 5a and facing the containment volume "V".

The guide tooth 6 further defines a second base surface 5b, consecutive with respect to the guide surface 6a.

Preferably the guide tooth 6 is adjacent to the respective side panel 2a or 2b and progressively moves away therefrom towards the base surface 5a, thus, towards the bottom wall 1, defining the guide surface 6a.

That is, the second base surface 5b is adjacent to the respective side panel 2a or 2b, and the inclination of the guide surface 6a is greater than an inclination of the respective side panel 2a or 2b.

With reference to a stack 300 such as that illustrated in FIGS. 5 and 6, i.e., a stack 300 comprising at least one box 100 and at least one container 200, the first and the second base surface 5a, 5b are intended to restingly receive a base portion 200a of the container 200 when in a stacking configuration.

That is, the base portion 200a of the container 200 can rest on the first base surface 5a, or alternatively on the second base surface 5b, as a function of an extension of the base portion 200a itself.

"Extension" is intended as a distance between two opposite ends of the base portion 200a intended to rest on corresponding side rest surfaces 5 facing the box 100.

"Facing" is intended as portions facing along a direction perpendicular to the side panels 2a, 2b of the box 100, i.e., a pair of portions in which one portion is comprised in the side panel 2a and another portion is comprised in the side panel 2b.

Advantageously, the guide surfaces 5a and 5b allow to realise a stack 300 comprising boxes 100 and containers 200, in which the containers 200 have a structure and/or dimensions deviating from the structure and/or dimensions of the box 100 within a range defined by an extension of the base surfaces 5a and 5b themselves towards the containment volume "V". That is, the base portion 200a of a container 200 stackable with the box 100 which is the subject-matter of the present invention can:

have an extension equal to a length of the bottom wall 1 of the box 100, measured between opposite recessed portions 3 from the side panel 2a to the side panel 2b along a direction perpendicular to the side panels 2a, 2b, or have an extension less than a length of the bottom wall 1 of the box 100, measured between opposite recessed portions 3 from the side panel 2a to the side panel 2b along a direction perpendicular to the side panels 2a, 2b, within a range defined by an extension of the base surfaces 5a, 5b themselves towards the containment volume "V", or have an extension greater than a length of the bottom wall 1 of the box 100, measured between opposite recessed portions 3 from the side panel 2a to the side panel 2b along a direction perpendicular to the side panels 2a, 2b, within a range defined by an extension of the base surfaces 5a, 5b themselves towards the containment volume "V".

In detail, the guide tooth 6 and the first base surface 5a have a length, measured along the respective side panel 2a, 2b from the bottom wall 1 to the front panel 2c, which is at least equal to half of a length of the protruding portion 4, measured in the same manner.

In more detail, at least half of one length of the protruding portion 4 is occupied by the first and by the second base surface 5a, 5b.

That is, the first and the second base surface 5a and 5b extend at least halfway along the protruding portion 4.

Consequently, at least half of the protruding portion 4 is intended to restingly receive the base portion 200a of an upper container 200.

Preferably, the first base surface 5a is configured to restingly receive the base portion 200a of the container 200 when in a stacking configuration, while the guide surfaces 6a of side rest surfaces 5 facing each other are converging towards the bottom wall 1, so as to define a lateral self-centring of the container 200 during an implementation of the stacking configuration.

That is, the guide surfaces 6a are opposite and converging towards the base surface 5a, thus defining a lateral self-centring of a box 100 or a container 200, when the latter is stacked on a lower box 100.

Therefore, both the side panel 2a and the side panel 2b comprise at least one side rest surface 5 comprising in turn a guide tooth 6, consequently, the guide surfaces 6a defined by the latter are opposite and converging with each other in the side panels 2a and 2b.

That is, considering the stacking configuration, the guide surfaces 6a of a lower box 100 define a temporary rest for an upper box 100 or an upper container 200 and such rest is made definitive and stable when an upper box 100, or an upper container 200, comes to rest on the respective base surface 5a of a lower box 100.

In detail, a container 200 generally comprises a lower side wall (not illustrated in the accompanying drawings) defined by an extension of the respective side wall 202 downwards from the bottom wall 201. Similarly, the box 100 also comprises a respective lower side edge (not illustrated in the accompanying drawings) defined by an extension of its side wall 2 downwards from its bottom wall 1.

Preferably, during the implementation of the stacking configuration, the lower side edge of the container 200 or of the box 100 gradually slides on the guide surface 6a of a lower box 100, thus achieving a lateral self-centring, and then rests stably on the base surface 5a thereof.

That is, the side rest surfaces 5 of the box 100, by means of the guide tooth 6 and the respective guide surface 6a, define a lateral self-centring of an upper container 200 or an upper box 100 during its stacking by guiding the lower side edge thereof towards the base surface 5a.

Advantageously, therefore, the guide tooth 6 and the respective guide surface 6a are adapted to facilitate the implementation of the stacking configuration between a box 100 and a container 200, or between a box 100 and an identical box 100.

With reference to FIGS. 2 and 4, preferably, the side rest surface 5 further comprises at least one retaining tooth 8, facing the guide tooth 6 and preferably adjacent to the base surface 5a.

The retaining tooth 8 of the box 100 is configured to realise a side locking of an upper box 100, or of an upper container 200, when in a stacking configuration.

That is, the retaining tooth 8 of the box 100 is configured to limit a sliding, along the front 2c and rear 2d panels, of an upper box 100, or an upper container 200, when in a stacking configuration.

In greater detail, the retaining tooth 8 of the box 100 defines, together with the base surface 5a and the guide tooth 6, a housing adapted to receive the lower side edge of an upper box 100, or an upper container 200, when in a stacking configuration. Consequently, the retaining tooth 8 defines, together with the base surface 5a and the guide tooth 6, a prismatic or undercut coupling with the lower side edge of an upper box 100, or an upper container 200, when in a stacking configuration.

That is, the retaining tooth 8 of a lower box 100 constrains the lower side edge of an upper box 100, or of an upper container 200, to remain resting on the base surface 5a of the lower box 100.

Advantageously, moreover, the retaining tooth 8 of the box 100 prevents the side wall 2 of the box 100, or the side wall 202 of the container 200, from excessively deforming due to the weight of an upper container 200 or an upper box 100.

Preferably, the guide tooth 6 and the retaining tooth 8 have a height, measured from the bottom wall 1 rising along the respective side panel 2a or 2b, lower than the height of the side panels 2a, 2b measured in the same manner.

Advantageously, such a feature allows to place in a stacking configuration, with a box 100 which is the subject-matter of the present invention, any identical container 200 having similar dimensions, or conformation, even if the container 200 is not configured to be stackable with the box 100. In addition, the guide tooth 6 and the retaining tooth 8 can have the same or a different height, measured from the bottom wall 1 rising along the respective side panel 2a or 2b.

Preferably, the side panels 2a, 2b of the box 100 are converging towards the bottom wall 1.

Therefore, a distance between the side panels 2a, 2b, measured from the side panel 2a to the side panel 2b along a direction perpendicular to the side panels 2a, 2b themselves at a portion thereof adjacent to the bottom wall 1, is less than a distance between the side panels 2a, 2b, measured at a portion thereof opposite the bottom wall 1 and in the same manner.

In other words, the box 100 is stackable with containers 200 having:

an upper portion 200b having a dimension equal to a distance, measured along a direction perpendicular to the side panels 2a, 2b themselves at a portion thereof adjacent to the bottom wall 1, and the box 100 is suitable to be rested on the upper portion 200*b* of a container 200 having the aforesaid dimensional features;

an extension of the base portion 200*a* equal to a distance between the side panels 2*a,* 2*b,* measured along a direction perpendicular to the side panels 2*a,* 2*b* themselves at a portion thereof opposite the bottom wall 1, and the box 100 is adapted to restingly receive (at least on the side rest surfaces 5 thereof) a base portion 200*a* of a container 200 having the aforesaid dimensional features.

In detail, and with reference to FIG. 8, the side panels 2*a,* 2*b* define with the bottom wall 1 an angle α comprised between 91° and 120°. Preferably, the side panels 2*a,* 2*b* define with the bottom wall 1 an angle α comprised between 92° and 110°.

Even more preferably, the side panels 2*a,* 2*b* define with the bottom wall 1 an angle α comprised between 96° and 98°.

In an embodiment illustrated in the accompanying drawings and with reference to FIG. 8, the angle α is equal to 97°. Preferably, the protruding portions 4 of the box 100 each have a pair of side walls 4*a,* 4*b* converging towards a top vertex 4*c,* as illustrated in FIGS. 1-4 3.

That is, the protruding portions 4 have a pointed profile. Preferably, the protruding portions 4 have a substantially triangular section.

Advantageously, such a conformation of the protruding portions 4 allows an easy implementation of the nesting configuration between the boxes 100, as well as an easier separation thereof when nested together.

Thanks to the top vertex 4*c,* a friction between nested boxes 100 is concentrated at the vertex 4*c* itself, i.e., it is not distributed equally over the entire side wall 2 of the nested boxes 100. Advantageously, the vertex 4*c* allows an implementation of the nesting configuration between boxes 100, as well as a separation of boxes 100 when nested, which requires little effort on the part of an operator.

Even more preferably, the first base surface 5*a* and the guide tooth 6 are arranged at a side wall 4*a* or 4*b* of the pair of side walls 4*a,* 4*b.*

That is, only one of the side walls 4*a* or 4*b* comprises the side rest surface 5. Therefore, the side rest surface 5 extends from the side wall 4*a* or from the side wall 4*b.*

In an embodiment of the box 100 illustrated in FIGS. 1 and 2, the first base surface 5*a* and the guide tooth 6 are arranged at a side wall 4*b* of the pair of side walls 4*a,* 4*b* which are diverging relative to the rear panel 2*d.*

That is, the side rest surface 5 is diverging relative to the rear panel 2*d.*

In a further embodiment of the box 100 illustrated in FIGS. 3 and 4, the first base surface 5*a* and the guide tooth 6 are arranged at a side wall 4*b* of the pair of side walls 4*a,* 4*b* which are converging relative to the rear panel 2*d.*

Advantageously, an inclination of the side rest surface 5 relative to the corresponding side panel 2*a* or 2*b* ensures that it is possible to stack the box 100 with containers 200 having different dimensions, or conformations, from the box 100 itself. That is, for the same protrusion of a protruding portion 4 towards the containment volume "V", an inclination of the side rest surface 5 with respect to the corresponding side panel 2*a* or 2*b* ensures a greater length of the side rest surfaces 5, measured along the respective side panel 2*a,* 2*b* from the bottom wall 1 to the front panel 2*c.*

The term "protrusion" is intended as a protruding portion 4 and a recessed portion 3, measured along a direction perpendicular to the recessed portion 3 itself.

The side walls 4*a* and 4*b* of the protruding portions 4, and in detail their convergence towards the top vertex 4*c,* in cooperation with the angle α defined by the side panels 2*a* and 2*b* of the box 100 with the bottom wall 1 of the box 100 itself, favour a compatibility of the box 100 with a container 200 having different dimensions, or conformations, from the box 100.

Generally, the side wall 202 of the container 200 defines a right angle β with the respective bottom wall 1, illustrated in FIG. 6. However, the base and upper portions 200*a* and 200*b* of the container 200 have different dimensions.

Thanks to the convergence of the side walls 4*a* and 4*b* of the protruding portions 4 towards the top vertex 4*c,* as well as due to the angle α defined by the side panels 2*a* and 2*b,* the box 100 has a first dimension, measured between the side panels 2*a,* 2*b* along a direction perpendicular to the side panels 2*a,* 2*b* themselves and at the respective side rest surfaces 5, which is different from a second dimension, measured between the side panels 2*a,* 2*b* along a direction perpendicular to the side panels 2*a,* 2*b* themselves near the bottom wall 1. The first dimension allows the box 100 to restingly receive a base portion 200*a* of the container 200, and the second dimension allows the box 100 to be rested on an upper portion 200*b,* having different dimensions from the base portion 200*a,* of the same container 200.

Consequently, the convergence of the side walls 4*a* and 4*b* of the protruding portions 4 towards the top vertex 4*c,* in cooperation with the angle α defined by the side panels 2*a* and 2*b* of the box 100 with the bottom wall 1 of the box 100 itself, defines the difference between the aforesaid first and second dimension, advantageously favouring a stackability of the box 100 with a container 200. In accordance with the embodiment illustrated in FIGS. 1 and 2:

a protruding portion 4 which is proximal with respect to the rear panel 2*d* is inclined towards the rear panel 2*d* (and therefore convergent with respect to the rear panel 2*d*) and comprises the first base surface 5*a* and the guide tooth 6 which are inclined towards the rear panel 2*d* (and therefore convergent with respect to the rear panel 2*d*);

a protruding portion 4 which is distal with respect to the rear panel 2*d* comprises the first base surface 5*a* and the guide tooth 6 arranged at a side wall 4*b* of the pair of side walls 4*a,* 4*b* which are diverging towards the rear panel 2*d.*

That is, the side rest surface 5 of a protruding portion 4 proximal to the rear panel 2*d* is convergent with respect to the rear panel 2*d* itself, while the side rest surface 5 of a protruding portion 4 which is distal with respect to the rear panel 2*d* is divergent with respect to the rear panel 2*d* itself.

In accordance with the embodiment illustrated in FIGS. 3 and 4:

a protruding portion 4 which is proximal with respect to the rear panel 2*d* is parallel to or divergent with respect to the rear panel 2*d* and comprises the first base surface 5*a* and the guide tooth 6 parallel to or divergent with respect to the rear panel 2*d;* a protruding portion 4 which is distal with respect to the rear panel 2*d* comprises the first base surface 5*a* and the guide tooth 6 arranged at a side wall 4*b* of the pair of side walls 4*a,* 4*b* which are converging towards the rear panel 2*d.*

That is, the side rest surface 5 of a protruding portion 4 proximal to the rear panel 2*d* is parallel to or divergent with respect to the rear panel 2*d* itself, while the side rest surface 5 of a protruding portion 4 distal with respect to the rear panel 2*d* is convergent towards the rear panel 2*d* itself. Both embodiments advantageously allow to prevent an oscillation around the side rest surfaces 5 themselves of a box 100, or a container 200, arranged in a stacking configuration and resting on the side rest surfaces 5 of the box 100.

Advantageously, the arrangement of the side rest surfaces 5 thus allows an increase in the stability of a box 100, or a container 200, arranged in a stacking configuration above the box 100. That is, the arrangement of the side rest surfaces 5 allows a greater stability of a stack 300 of stacked boxes 100 and containers 200.

With reference to FIGS. 1 and 3, in order to allow the implementation of the first stacking configuration, the box 100 preferably comprises a step 11 at an upper portion of the rear panel 2d.

The step 11 is turned towards the containment volume "V" and is configured to restingly receive a lower portion of an upper box 100, or a base portion 200a of a container 200, when in a stacking configuration.

Therefore, when an upper box 100, or an upper container 200, and a lower box 100 are in a stacking configuration, a lower rear portion of the upper box 100 or upper container 200 rests on the step 11 of the lower box 100.

In this case, there is therefore provided a vertical support of an upper box 100 or an upper container 200 both laterally, by means of the side rest surface 5 of a lower box 100, and, behind, by means of the step 11 of a lower box 100.

With reference to FIG. 1 and FIG. 3, in order to allow the implementation of the stacking configuration, the rear panel 2d of the box 100 comprises a receiving portion 9 above. Said receiving portion 9 is preferably defined on the mentioned step 11.

Preferably, a length of the receiving portion 9, measured from the rear panel 2d to the front panel 2c along a direction perpendicular to the rear and front panels 2d and 2c, is equal to a length of the guide tooth 6 and the first base surface 5a, measured along the respective side panel 2a, 2b from the bottom wall 1 to the front panel 2c.

Advantageously, the length of the receiving portion 9 contributes to favouring a possibility of stacking the box 100 with a container 200 with a different conformation, or with different dimensions.

Preferably, the rear panel 2d of the box 100 comprises above, at the receiving portion 9, a locking tooth 12 facing the containment volume "V" and defining the receiving portion 9, configured to provide a vertical support and stably retain and in a predetermined position a corresponding lower portion of a box 100, or a corresponding base portion 200a of an upper container 200 when in a stacking configuration.

That is, the locking tooth 12 defines with the step 11 a housing adapted to receive the lower rear edge of an upper container 200 or an upper box 100, providing a vertical support thereof and retaining it stably and in a predetermined position.

More in detail, the locking tooth 12 allows to hook the lower rear edge of an upper box 100, or an upper container 200, advantageously providing a support useful to facilitate the implementation of the stacking configuration.

Considering the stacking configuration, there is therefore provided a vertical support of an upper box 100 or an upper container 200 both laterally, by means of the side rest surfaces 5 of a lower box 100, and behind, by means of the step 11 of a lower box 100.

Considering the stacking configuration, there is further provided a front locking operated by the locking tooth 12 of a lower box 100, i.e., there is provided a limitation to the sliding of an upper box 100 or an upper container 200 along the side panels 2a and 2b.

That is, considering the stacking configuration, "front locking" means that the locking tooth 12 of a lower box 100 limits the sliding on its side rest surfaces 5 of a stacked upper box 100, or stacked container 200, from the rear panel 2d towards the front panel 2c.

Preferably, the locking tooth 12 defines a corresponding rib 13, illustrated in FIG. 1 and in FIG. 3.

Even more preferably, the rib 13 extends from the locking tooth 12 towards the bottom wall 1 preferably up to the bottom wall 1 itself and acts as a spacer between the rear panel 2d of the box 100 and the rear panel 2d of an upper box 100, when in a nesting configuration.

In particular, the rib 13 is in relief from the rear panel 2d towards the containment volume "V".

When an upper box 100 is nested within a lower box 100, the rib 13 of the second box preferably comes into contact with an outer portion of the rear panel 2d of the first and avoids direct contact between the rear panels 2d of the two nested boxes 100.

With reference to the accompanying drawings, the front panel 2c of the box 100 has a height, measured by rising from the bottom wall along the front panel 2c, lower than a height of the rear panel 2d, measured by rising from the bottom wall 1 along the rear panel 2d.

Furthermore, the front panel 2c has a height, measured by rising from the bottom wall 1 along the front panel 2c, lower than a height of the rear panels 2a and 2b, measured by rising from the bottom wall 1 respectively along the rear panels 2a and 2b.

In other words, the front panel 2c is lower than the other panels 2a, 2b, 2d of the box 100.

Advantageously, this feature makes access to the box 100 readily and easily available, when stacked with one or more boxes 100. Considering a stack 300 of boxes 100, preferably also comprising containers 200, in a stacking configuration, the lower height of the front panel 2c allows to define, between the front panel 2c of a lower box 100 and the upper box 100 or upper container 200, an access portion to the contents of the box 100.

Advantageously, the conformation of the front panel 2c allows to promote a manual insertion of various objects within the box 100 when stacked with upper boxes 100, or upper containers 200.

The present invention reaches the proposed object, overcoming the disadvantages of the prior art.

Advantageously, the box 100, thanks to the first and the second base surface 5a and 5b, allows a stacking with containers 200 with similar dimensions but with different structure. That is, the conformation of the box 100 makes it stackable with other containers 200 that are not normally stackable with each other.

Advantageously, the box 100, thanks to the retaining tooth 8 and the locking tooth 12, as well as the protruding portions 4 projecting towards the containment volume "V", ensures a stable stability of a stack of boxes 100, also comprising containers 200.

Advantageously, the lower height of the front panel 2c with respect to the side panels 2a, 2b and with respect to the rear panel 2d allows an operator to readily and easily access each box, when stacked with one or more boxes 100 or with one or more containers 200.

The invention claimed is:

1. A stackable box (100) comprising:
   a bottom wall (1);
   a side wall (2) which rises from the bottom wall (1) and which is defined by side panels (2a, 2b), a front panel (2c) and a rear panel (2d), the side wall (2) defining with the bottom wall (1) a containment volume (V) open above the bottom wall (1), the side panels (2a, 2b) comprising at least one recessed portion (3) which is recessing from at least one portion protruding (4) on the side panels (2a, 2b) towards the containment volume (V), wherein:

each recessed portion (3) is configured to fit inside a corresponding recessed portion (3) of a lower identical box (100) that is stackable and/or nestable in a nesting configuration;

each protruding portion (4) comprises at least one side rest surface (5), the at least one side rest surface (5) configured to receive a base portion (200a) of a container (200) in a stacking configuration, and/or wherein said side wall (2) is adapted to rest on an upper portion (200b) of the container (200) in said stacking configuration;

the side rest surface (5) comprises at least a first base surface (5a) and at least one guide tooth (6) defining:

a guide surface (6a), inclined towards the first base surface (5a) and facing the containment volume (V), and a second base surface (5b), adjacent to said guide surface (6a), said first and/or said second base surface (5a, 5b) being intended to restingly receive a base portion (200a) of the container (200) when in said stacking configuration, the container (200) having dimensions compatible with, or close to, the dimensions of the stackable box (100), wherein said protruding portions (4) each have a pair of side walls (4a, 4b) converging towards a top vertex (4c), and wherein said first base surface (5a) and said guide tooth (6) are arranged along only one side wall of said pair of side walls (4a, 4b).

2. The box (100) according to claim 1, wherein said first and said second base surface (5a, 5b) have a length, measured from the bottom wall (1) to the front panel (2c) along the respective side panel (2a, 2b), at least equal to half of a length of said protruding portion (4).

3. The box (100) according to claim 1, wherein said first base surface (5a) is configured to receive a base portion (200a) of the container (200) in said stacking configuration and wherein the guide surfaces (6a) are opposite each other and converging towards the bottom wall (1), so as to define a lateral self-centring of the container (200) during an implementation of said stacking configuration.

4. The box (100) according to claim 1, wherein said side panels (2a, 2b) are converging towards said bottom wall (1).

5. The box (100) according to claim 4, wherein said side panels (2a, 2b) define with the bottom wall (1) an angle (α) between 91° and 120.

6. The box (100) according to claim 1, wherein said first base surface (5a) and said guide tooth (6) are arranged at a side wall (4b) of said pair of side walls (4a, 4b) which are diverging relative to said rear panel (2d).

7. The box (100) according to claim 1, wherein said first base surface (5a) and said guide tooth (6) of the protruding portion (4) being inclined towards the rear panel (2d).

8. The box (100) according to claim 1, wherein said side rest surface (5) comprises at least one retaining tooth (8) facing said guide surface (6a) and configured to realize a side locking of the container (200) when in said first stacking configuration, said retaining tooth (8) defining, together with said guide tooth (6), a prismatic coupling or with undercut with a lower portion of the container (200), when in said stacking configuration.

9. The box (100) according to claim 1, wherein said rear panel (2d) comprises a step (11) facing said containment volume (V) and having above a receiving portion (9) intended to receive a lower portion (200b) of the container (200) or a lower portion of an identical stackable box (100), wherein said receiving portion (9) has a length, measured from the rear panel (2d) to the front panel (2c), said receiving portion length being at least equal to a length of said guide tooth (6) and said first base surface (5a), the length of the guide tooth and first base surface being measured along the respective side panel (2a, 2b) from the bottom wall (1) to the front panel (2c).

\*  \*  \*  \*  \*